July 26, 1949.   O. E. WOLFF   2,477,324
SELF-DEVELOPING CAMERA

Filed June 25, 1948   3 Sheets-Sheet 1

INVENTOR
Otto E. Wolff
BY Donald R. Brown
and
Oliver A. Hayes
Attorneys

July 26, 1949.  O. E. WOLFF  2,477,324
SELF-DEVELOPING CAMERA
Filed June 25, 1948  3 Sheets-Sheet 2

INVENTOR
Otto E. Wolff
BY Donald R. Brown
and
Oliver N. Hayes
Attorneys

July 26, 1949. O. E. WOLFF 2,477,324
SELF-DEVELOPING CAMERA
Filed June 25, 1948 3 Sheets-Sheet 3

INVENTOR
Otto E. Wolff
BY Donald L. Brown
and
Oliver H. Hayes
Attorneys

Patented July 26, 1949

2,477,324

UNITED STATES PATENT OFFICE 2,477,324

SELF-DEVELOPING CAMERA

Otto E. Wolff, Cambridge, Mass., assignor to Polaroid Corporation, Cambridge, Mass., a corporation of Delaware Application June 25, 1948, Serial No. 35,192

15 Claims. (Cl. 95—13)

This invention relates to photography and more particularly to novel photographic apparatus such as a camera of the type described and claimed in the copending application of Edwin H. Land filed on even date herewith. Cameras of the type described in the above-mentioned copending application are particularly designed for use with photographic film units comprising a photosensitive layer carried by a base sheet, an image-carrying sheet superposed therewith and a container positioned for discharge of a contained processing liquid between said sheets. Such a camera includes means for holding one of the sheets stationary in the camera, means for moving the other sheet out of superposition with the held sheet so as to permit exposure of the photosensitive layer carried by one of the sheets and means for processing the exposed photosensitive layer by passing said unit between a pair of pressure members which release the processing liquid from the container and spread this liquid between two sheets.

A principal object of the present invention is to provide an improved camera of the above type which is particularly adapted for sequentially exposing and processing a number of the above film units contained in a suitable housing, such as a magazine, therefor.

Another object of the present invention is to provide improved means in cameras of the above type for moving one of the sheets in a film unit of the type mentioned above to permit exposure of the photosensitive layer carried by one of the sheets of the film unit.

Still another object of the present invention is to provide cameras of the above type including improved means for advancing the film unit, after exposure, to the processing members carried by the camera.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
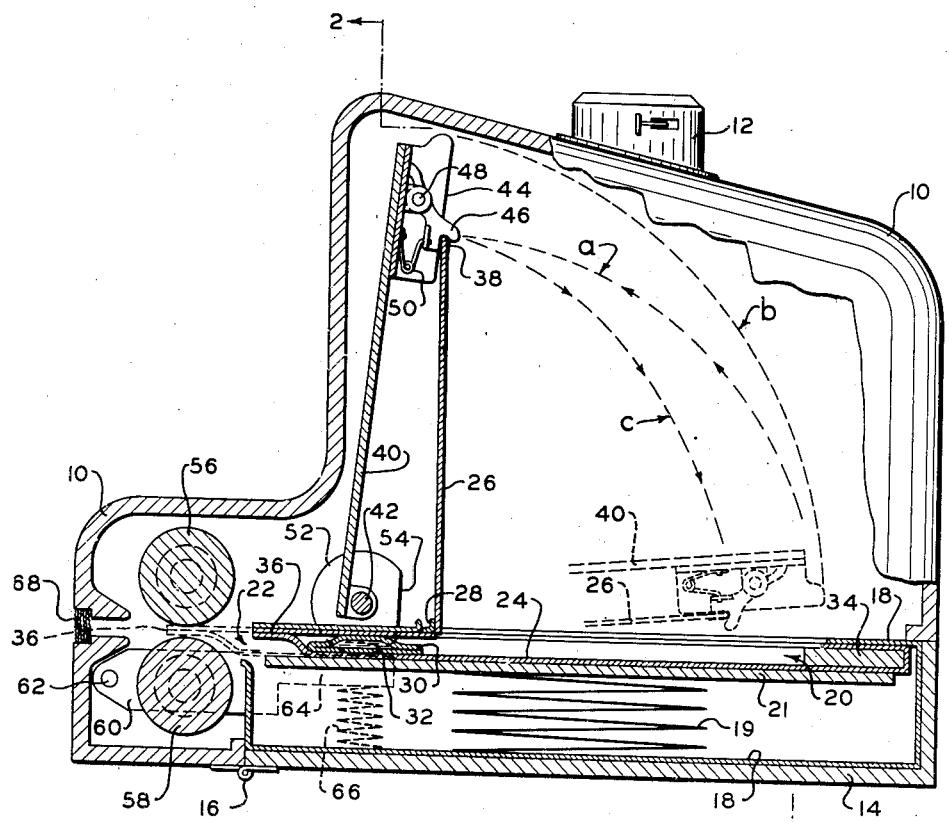
Figure 1 is a diagrammatic fragmentary exaggerated sectional view of a hand-held camera embodying one preferred form of the invention.

In general this invention relates to camera apparatus particularly adapted for use with novel film units comprising a photosensitive sheet including a photosensitive silver halide layer carried by a base sheet, an image-carrying sheet superpositioned with the photosensitive layer and a container positioned between the two sheets adjacent an area of the photosensitive layer adapted to be exposed to light. These two sheets lie on opposite sides of the photosensitive layer and preferably include light-opaque strata so as to prevent actinic light from reaching the photosensitive area when the two sheets are superposed. One of these sheets is displaceable from superposition with the other sheet so as to permit exposure of this photosensitive area when the film unit is positioned in the camera. This invention relates primarily to improved means for handling such film units so as to permit the exposure of the photosensitive area and to facilitate the processing thereof.

A preferred form of the apparatus of the invention comprises means for holding the film unit while the photosensitive sheet and image-carrying sheet are superposed, this means preferably comprising a magazine holder in which a magazine containing a plurality of such film units may be positioned. The camera preferably includes a discharge opening positioned adjacent a corresponding opening in the magazine so that the two sheets of a film unit may be discharged from the magazine after exposure and during the processing thereof. To permit exposure of the photosensitive area of the film unit, there are provided means for engaging a portion of one of the two sheets of the film unit and for moving the engaged sheet out of superposition with the other sheet while this other sheet is held stationary. There is also provided a means for exposing the photosensitive area to actinic light when the two sheets are out of superposition. For processing the exposed film unit there is provided a processing means preferably comprising a pair of pressure-applying surfaces mounted adjacent the above-mentioned discharge opening, these pressure-applying surfaces being adapted to compress the film unit during advancement thereof between said surfaces so as to release the processing liquid carried by the container and to spread the liquid between facing surfaces of the exposed photosensitive sheet and the image-carrying sheet. In a preferred form of the invention, there is provided a means associated with the sheet-engaging and moving means which is capable of moving the whole film unit from its position in the magazine and towards said processing members as a result of movement of the moved sheet, and preferably as a result of part of the movement of the sheet back into superposition with the sheet which was held stationary during exposure.

In a preferred form of film unit for use with a camera embodying certain features of the present invention, the image-carrying sheet is hingedly related to the film unit so as to be moved with respect to the photosensitive sheet to permit exposure of the photosensitive sheet which is held in the focal plane. In this form of the invention, the engaging means of the camera engages a portion of the image-carrying sheet and swings the image-carrying sheet while the photosensitive sheet remains stationary. Exposure of the photosensitive sheet is accomplished and the image-carrying sheet is returned to superposition therewith. During the return movement of the image-carrying sheet, this sheet is pushed towards the pressure members, this pushing force being transmitted, through the hinge, to the remainder of the film unit and moving the whole film unit towards the pressure members. While the film unit is being so pushed, the pressure members are preferably separated so as to permit ready entry therebetween of a leader part of the film unit.

Figure 2:
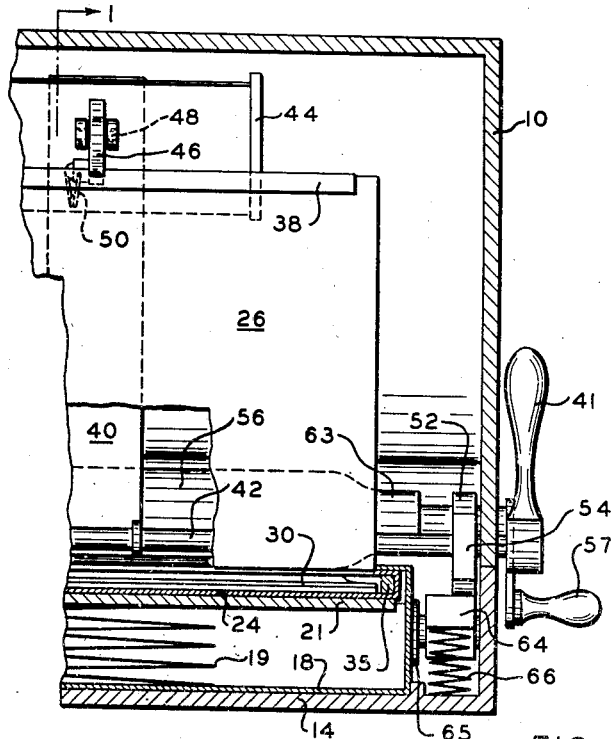
Fig. 2 is a diagrammatic fragmentary sectional view of Fig. 1 taken along the line 2—2.

Referring now to Figs. 1 and 2, there is shown one such preferred form of the invention as embodied in a hand-held camera. In these figures, the camera body 10 is shown, schematically, as carrying a lens and shutter 12. A magazine holder 14 is preferably hingedly secured to the camera body as at 16 and contains a magazine 18. Within the magazine there is shown one film unit 20. The magazine includes a usual spring 19 and backing plate 21, for moving the film units to the top of the magazine, and is provided with a discharge opening 22.

Figure 3:
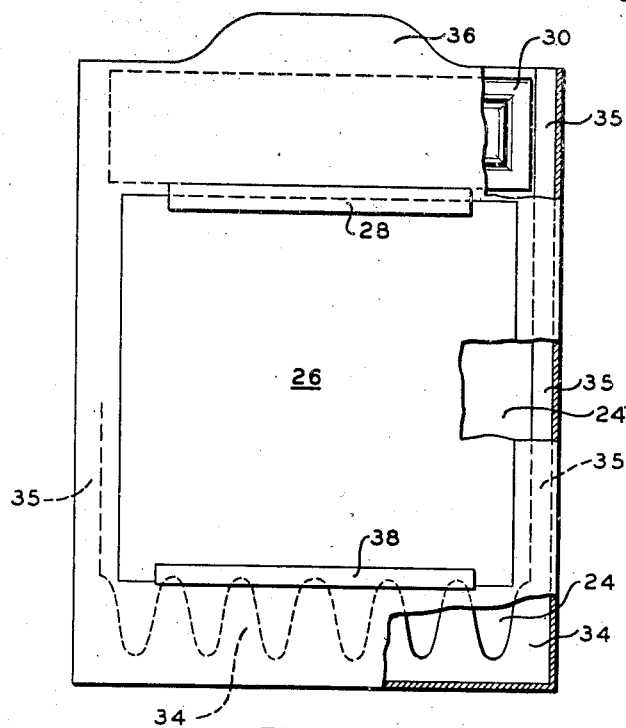
Fig. 3 is a fragmentary plan view of one preferred form of film unit for use in the camera of Figs. 1 and 2.

Each film unit, shown also in Fig. 3, preferably comprises a photosensitive sheet 24 and an image-carrying sheet 26, this image-carrying sheet being connected, in the preferred form, by means of a hinge 28 to the remainder of the film unit. Positioned so as to discharge a contained processing liquid between the two superposed sheets is a container 30, the processing liquid being indicated at 32. At the end of the film unit opposite the container there is shown, schematically, a trap 34. End portions of the sheets 26 and 24 are preferably secured together to form a leader portion 36. Along each of the two longitudinal edges of the film unit there is preferably positioned a reinforcing strip 35 (see Fig. 3).

In one preferred form of the invention, a portion of the image-carrying sheet 26 is adapted to be engaged by means in the camera for moving this sheet. This portion is shown at 38 as comprising a metallic clip which can be attracted by a permanent magnet, the clip being secured to the end of the swinging portion of the image-carrying sheet. For moving the image-carrying sheet, there is provided a swinging arm 40 mounted on a pivoted shaft 42. Carried by the outer end of arm 40 is an engaging means, shown as a permanent magnet 44, this magnet being sufficiently strong to engage metallic clip 38 and to hold this clip firmly during the swinging motion of the arm 40. For applying a pushing force to the end of the image-carrying sheet, there is provided a catch 46 pivotally secured to the arm 40 as at 48. The catch 46 is normally rotated into the position shown by means of a weak spring 50, this spring 50 exerting a force considerably less than the attractive force exerted by magnet 44 upon the metallic clip 38. Also carried by the arm-operating shaft 42 is a cam 52 having a flat portion 54.

For the purpose of processing the film unit, after exposure thereof, by releasing and spreading the processing liquid 32 between the two sheets, there is provided a pair of pressure-applying members shown, in the preferred form, as a pair of pressure rolls 56 and 58. Pressure roll 56 is preferably rigidly secured to housing 10 while pressure roll 58 is carried by a pair of arms 60. The ends of rolls 56 and 58 are preferably of reduced diameter as shown at 63 and 65, respectively, in Fig. 2.

Arms 60 are preferably pivoted to the housing 10 at 62, each arm having a cam follower extension 64 adapted to be engaged by cam 52. For normally urging each arm 60 upwardly there is provided a relatively strong spring 66, thus spring 66 normally urges roll 58 towards roll 56. When the circular portion of cam 52 is in the position shown, it maintains these pressure rolls spaced apart. When arm 40 is rotated slightly beyond the nearly horizontal position shown in the dotted line in Fig. 1, the flat portion of cam 54 allows the cam follower portion 64 of arm 60 to move upwardly, thereby moving pressure roll 58 towards pressure roll 56.

For rotating arm 40, there is provided a handle 41 secured to shaft 42. For rotating pressure roll 56, there is provided a handle 57. A light-tight discharge opening 68 is preferably included to permit advancement of the processed film unit from the camera housing.

In the use of the invention described in connection with the above discussion of Figs. 1, 2 and 3, the magazine holder 14 is swung from the camera body so as to permit insertion of a magazine within the holder. The magazine preferably includes a plurality of the film units 20, the backing plate 21 and the spring 19 of the magazine tending to force the film units towards the top of the magazine, the topmost film unit being held in the plane of the discharge opening 22. The reinforcing strips 35 and traps 34 are preferably sufficiently incompressible so as to transmit a force, exerted by backing plate 21, between the various film units, thereby holding the top film unit flat at the top of the magazine with its photosensitive sheet in exposure position within the focal plane. The magazine preferably has a cover sheet (not shown) provided with a tab which can be inserted between the rolls 56, 58 during the loading of the magazine so that, when the camera has been made light-tight by moving the magazine holder into its operative position, this cover sheet may be removed by suitably rotating rolls 56 and 58. The camera is then loaded and ready for use.

In the operation of the camera, the arm 40 is swung to the right till the magnet 44 engages the metallic clip 38 associated with the topmost film unit. As can be seen from an examination of Fig. 1, when the magnet 44 is in position to engage clip 38 the outer end of the magnet will be aligned with the clip 38 and catch 46 will be moved towards arm 40 due to the fact that it bears against the topside of the image-carrying sheet 26. As arm 40 is rotated to the left, it pivots around the rod 42, while the image-carrying sheet 26 pivots around the hinge 28. As a result of the difference in hinge points, the metal clip 38 will travel along the arc $a$ while the end of the magnet travels along arc $b$. The difference in these arcs will cause the clip 38 to travel down the surface of magnet 44 until it passes beyond the end of catch 46 to the position shown in Fig. 1, the magnet 44 gripping clip 38 strongly in spite of this sliding motion of the clip with respect thereto. When the arm 40 has been moved in the position shown in Fig. 1, exposure of the photosensitive sheet in the focal plane of the camera may now be accomplished by suitably operating the shutter 12. Arm 40 is then rotated to the right to move the image-carrying sheet 26 back into suitable position with the exposed photosensitive sheet 24. During this movement of arm 40, the catch 46 prevents the end of the image-carrying sheet from sliding upwardly along the surface of magnet 44. Thus it forces the end of the image-carrying sheet 26 to travel in arc $c$, this arc having a diminishing radius with respect to the original pivot point. Consequently, the catch 46 exerts a strong pushing force on the end of the image-carrying sheet 26. This pushing force is transmitted through the hinge 28 to the whole film unit and tends to push the film unit to the left as shown in Fig. 1. During the downward movement of arm 40, circular portion of cam 52 is in engagement with cam follower extension 64 on arm 60, thereby maintaining roll 58 spaced from roll 56. Thus, as the film unit moves to the left, due to rotation of the arm 40 to the right, the leader portion 36 of the film unit is able to pass between the separated rolls 56, 58. When the arm 40 reaches the dotted line position shown in Fig. 1, the movement of the leader portion 36 of the film unit to the dotted line position has been substantially completed. At about this time, the flat portion 54 of the cam 52 is brought into position adjacent cam follower extension 64, thereby allowing spring 66 to urge the roll 58 towards roll 56. Crank 57 is now turned so as to rotate roll 56, thus propelling the film unit between the two rolls. As a result of this movement of the film unit, the liquid 32 is released from the container 30 and spread between the facing surfaces of the exposed photosensitive sheet 24 and the image-carrying sheet 26, the liquid laminating these two sheets together and accomplishing a predetermined processing of at least the exposed photosensitive area, the processed film unit being ejected from the discharge opening 68.

The pressure rolls 56 and 58 are preferably formed of rubber, although they may be formed of other materials, such as stainless steel or plastics. The photosensitive sheet 24 preferably comprises a photosensitive silver halide, coated upon a suitable base which is preferably opaque to actinic light. The image-carrying sheet 26 may comprise a sheet of baryta paper which preferably is stiffened by having a relatively stiff backing sheet, such as cardboard, applied thereto. The processing liquid 32 preferably is capable of at least developing a latent negative image in a silver halide photosensitive layer and is also preferably capable of forming a positive image, of the latent negative image, on the surface of image-carrying sheet 26. This liquid 32 may comprise a viscous aqueous alkaline solution of a developer and a silver halide solvent. The trap 34 and reinforcing strips 35 are preferably of the same thickness as the container 32 and are formed of a relatively incompressible material such as stiff cardboard, thus preventing crushing of the container 30 due to force exerted by spring 19. When such a film unit passes between pressure rolls 56 and 58, the intermediate portions of the pressure rolls engage the container portion of the film unit to force the liquid therefrom and spread the liquid lengthwise of the film unit, the pressure rolls being separated as the trap portion of the film unit passes therebetween. Thus any excess liquid being spread, when the trap is reached, is confined within the trap. The tapered end portions, 63 and 65, of the rolls provide relatively widely separated portions of the pressure rolls at the ends thereof so that the reinforcing strips 35 may readily pass between the rolls. These tapered portions of the rolls have the additional advantage of relieving the hydraulic pressure at the edge boundaries of the body of liquid being spread so that there is substantially no liquid pressure tending to force this liquid towards the edges of the film unit. Thus, there is substantially no liquid pressure along the edges of the hinged portion of the image-carrying sheet 26.

While one preferred form of camera and film unit have been discussed above, this camera may be considerably modified without departing from the scope of the invention. For example, the photosensitive sheet may be the sheet 26. In this case, the lens and shutter 12 would be positioned on the end of the camera instead of the top of the camera as shown.

In either method of exposure (i. e., the preferred form wherein the sheet 24 is the photosensitive sheet or the alternative form wherein the sheet 26 is the photosensitive sheet) a non-reflecting screen may be provided in the camera which can be moved into superposition with the image-carrying sheet while the photosensitive sheet is in the focal plane. The purpose of such a screen is to prevent reflection of light from the surface of the image-carrying sheet and thus to prevent fogging of the photosensitive layer. Preferred types of such nonreflecting screens are shown in the copending application of Murry N. Fairbank filed on even date herewith.

In some cases it may be desirable to have another flat portion of the cam 52, this flat portion being adapted to engage portion 64 of arm 60 when the arm 40 is in the position shown in Fig. 1. This additional flat portion on the cam may thus have the advantage of holding the arm 40 in the position shown.

With respect to the means for pushing the film unit into the bite of the pressure rolls, considerable modifications are feasible within the scope of the present invention. For example, in one less preferred form, the catch 46 may rotate around the pivot provided by rod 42, as shown, while a separate arm carrying magnet 44 may be pivoted around a point substantially coaxial with the hinge point for the sheet 26. In still another form of the invention, the arm 40 and rod 42 may be arranged as shown, while the magnet 44 may be slidably mounted on arm 40.

The film unit may be considerably modified from the form shown and may have tabs or hooks, associated therewith, which are adapted to be engaged by a suitable means carried by the end of arm 40. In this case, the tabs or hooks may be used for causing the movement of the sheet 26, while an additional portion of the film unit may be engaged by means associated with the arm 40 for pushing the film unit during the return movement of the sheet 26. In some cases, it may also be desirable to have a light trap associated with the film unit adjacent the edges of that portion of sheet 26 which is swung during the use of the camera. This light trap may conveniently comprise overlapping edges surrounding the hinged portion of sheet 26, so that, when this sheet 26 is moved back into superposition with the photosensitive sheet, the entrance of light is positively prevented.

Figure 4:
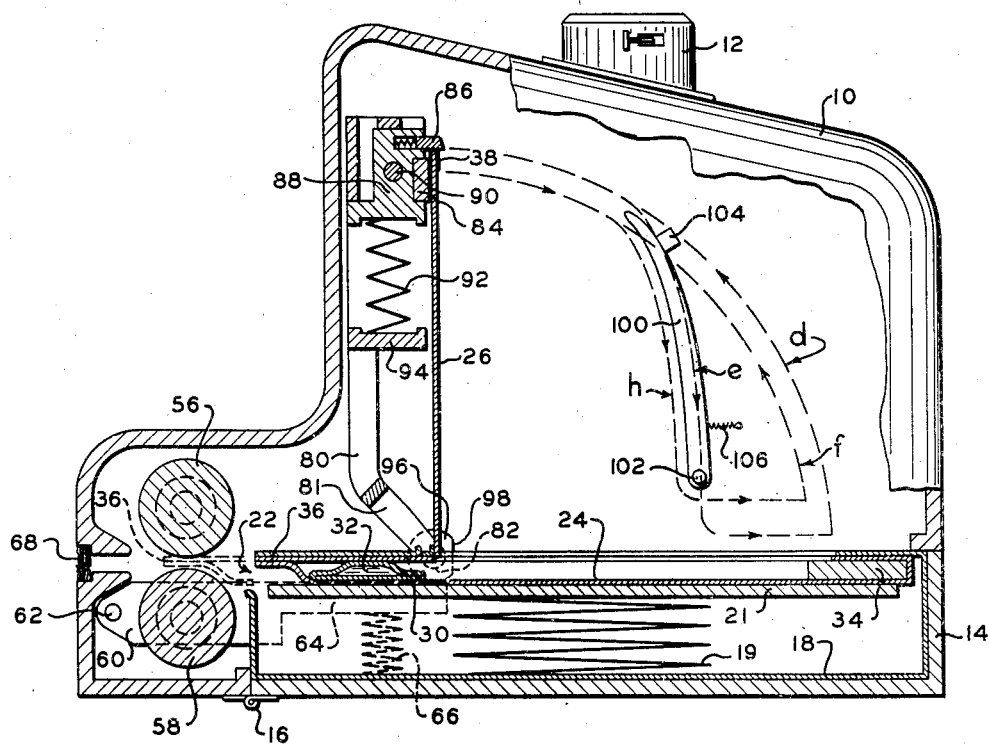
Fig. 4 is a diagrammatic fragmentary sectional view of another form of the invention.

Referring now to Fig. 4, there is shown still another form of the invention wherein the engaging means and the sheet-pushing means normally tend to travel in substantially the same arc as the corresponding portions of the engaged sheet, and cam means are provided for moving the sheet-pushing means from this normal arc to push the film unit into the bite of the pressure rolls. With the preferred form shown, the cam means is operative to push the engaged sheet as it is being returned to superposition with the photosensitive sheet. In this figure, like numbers refer to like elements in the other figures, 10 indicating the camera housing, etc. In this modification of the invention, the engaging means comprises a means such as a magnet 84 mounted on a swinging arm 80. Arm 80 includes a yoke 81 which is pivotally carried by a pair of hinge pins 82 secured to the side walls of the camera, each pin 82 being substantially coaxial with the pivot point for the image-carrying sheet 26. For bearing on the end of the moved portion of the sheet 26, there is provided a spring-mounted pin 86. Pin 86 is, in a preferred form, carried by a block member 88 slidably mounted on arm 80 and preferably secured to and supporting magnet 84. For moving catch 86 from its normal arc, there is provided a cam follower 90 extending through the block member 88. For normally maintaining the block member 88 in the position shown, there is included a spring 92, one end of which is attached to the arm 80 by means of a plate 94. Carried by the yoke 81, and rotatable therewith, is a cam member 96 having a flattened portion 98, this cam member 96 and flattened portion 98 corresponding to the cam member 52 and flattened portion 54 of Fig. 1.

For operating on the cam follower 90, there is provided a cam means 100, which cam is preferably pivotally secured to one of the side walls of the camera, for example by means of a pin 102. A stop 104 prevents a clockwise movement of cam 100 and a spring 106 normally maintains cam 100 against stop 104.

In the operation of the camera of Fig. 4, after loading in the same manner as described in connection with the camera of Figs. 1 and 2, the arm 80 is rotated to a horizontal position so that magnet 84 engages the metallic clip 38 associated with the image-carrying sheet 26. The arm 80 is then swung to the left, catch 86 being adjacent the end of sheet 26. During the movement of arm 80 to the left, the catch 86 follows the arcuate path $d$ and the cam follower 90 follows the arcuate path $f$, cam follower 90 pushing cam 100 to the left as it moves upwardly. After exposure of the photosensitive sheet 24, the arm 80 is swung to the right. During this movement, cam follower 90 hits cam 100, cam 100 forcing the cam follower 90 to follow the path $h$ during this return movement. The movement of cam follower 90 along the path $h$ causes the catch 86 to follow the path $e$, thus causing catch 86 to exert a pushing force on the end of the image-carrying sheet 26, thereby pushing the leader portion 36 of the film unit between the rolls 56, 58. During the swing of arm 80, these rolls are maintained spaced apart by the curved portion of the cam 96. At about the time that the cam follower 90 reaches the lower end of cam 100, the flat portion 98 of cam 96 is positioned adjacent the cam follower portion 64 of arm 60, thereby allowing the roll 58 to move towards roll 56. When the cam follower 90 passes the lower end of cam 100, spring 92, bearing on the block 88, pushes the block 88 and the cam follower 90 to the right, thereby also moving the catch 86 and magnet 84 to the right, so that they will be in position for engaging the next film unit.

The above-described modification of the invention has the advantage that there is substantially no relative movement between the engaged sheet and the engaging means during the swinging thereof. This arrangement permits a wide choice of engaging means other than the particular type shown. For example, this engaging means, instead of comprising a magnet, may be a hook, a tacky adhesive, a thumb tack, or a pin adapted to pass through a hole in the image-carrying sheet 26, and any other suitable means which may be provided, depending upon the particular type of film unit employed. When the engaging means, associated with the arm 80, forms a relatively strong bond with the engaged portion of the image-carrying sheet 26, the movement of the block 88 to the right may be employed to break this bond. In this case, the spring 92 may be made relatively strong so as to exert a strong force on the block 88. Rolls 56, 58 will firmly grip the leader portion 36 of the film unit during this movement of the block 88 to the right and to prevent rotation of the rolls, a ratchet may be employed. Thus the rolls will firmly hold the film unit while the bond between the engaging means and the engaged sheet is broken by the spring 92.

With the above modification of the invention, it may be desirable to have the engaging means, such as a magnet, fixedly secured to the arm 80, in which case catch 86 alone may move under the influence of the cam follower 90. Equally, the cam follower 90 and the cam 100 may be arranged so that a pushing force may be exerted on the sheet 26 during the opening movement of the sheet 26 rather than during the closing movement thereof.

The camera of Fig. 4 may be modified to permit movement of the photosensitive sheet into the focal plane, in which case the sheet 26 may be assumed to be the photosensitive sheet, the lens and shutter being placed on the end of the camera, instead of on the top. With this modification of the invention, the edges of the moved photosensitive sheet may be clamped to hold this sheet more securely. When clamps are employed, these clamps may be carried by the arm 80 and may be operated by a stationary cam and a cam follower associated with the clamps. In such a modification, the clamps may additionally slide with respect to the arm 80 during the pushing of the moved sheet, thus supporting the sheet during the whole time that it is being pushed to slide the film unit into the bite of the pressure rolls.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Camera apparatus for use with a composite film unit, said unit comprising a photosensitive sheet including a photosensitive layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding one of said sheets stationary, means for engaging and moving a portion of said film unit so as to move the other sheet out of superposition with said held sheet, means for exposing said photosensitive area when said sheets are out of superposition, means comprising a pair of pressure-applying surfaces mounted adjacent said holding means, said holding means being arranged to release said held sheet for movement, in superposition with the other sheet, between said pressure-applying surfaces, and means associated with said engaging and moving means for pushing said engaged sheet to cause a sliding of said film unit from its held position towards said pressure-applying surfaces during at least a portion of said movement of said engaged sheet, said pressure-applying surfaces being adapted to compress said film unit during advancement of said unit between said surfaces, progressive subjection of said composite unit to compression providing release of said processing liquid from said container and spreading of said liquid between facing surfaces of said exposed photosensitive sheet and said second sheet.

2. Camera apparatus for use with a composite film unit, said unit comprising a photosensitive sheet including a photosensitive layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding one of said sheets stationary, means for engaging and moving a portion of said film unit so as to move the other sheet out of superposition with said held sheet, means for exposing said photosensitive area when said sheets are out of superposition, means comprising a pair of pressure rolls mounted adjacent said holding means, said holding means being arranged to release said held sheet for movement, in superposition with the other sheet, between said pressure rolls, means associated with said engaging and moving means for pushing said engaged sheet to cause a sliding of said film unit from its held position towards said rolls during at least a portion of said movement of said engaged sheet, and means for separating said rolls as said film unit is being slid towards said rolls to permit introduction between said rolls of a portion of said film unit, said roll-separating means being rendered operative at least during operation of said sheet-pushing means, said pressure rolls being adapted to compress said film unit during advancement of said unit between said rolls, progressive subjection of said composite unit to compression providing release of said processing liquid from said container and spreading of said liquid between facing surfaces of said exposed photosensitive sheet and said second sheet.

3. Camera apparatus for use with a composite film unit, said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding one of said sheets stationary, means for engaging and moving a portion of said film unit so as to move the other sheet out of superposition with said held sheet, means for exposing said photosensitive area when said sheets are out of superposition, means comprising a pair of pressure rolls mounted adjacent said holding means, said holding means being arranged to release said held sheet for movement, in superposition with the other sheet, between said pressure rolls, and means associated with said engaging and moving means for pushing said engaged sheet to cause a sliding of said film unit from its held position towards said rolls during at least a portion of said movement of said engaged sheet, said engaging means being carried by a swinging arm, said pushing means being rendered operative during swinging of said engaged sheet to superposition with the other sheet, said pressure rolls being adapted to compress said film unit during advancement of said unit between said pressure rolls, progressive subjection of said composite unit to compression providing release of said processing liquid from said container and spreading of said liquid between facing surfaces of said exposed photosensitive sheet and said second sheet.

4. Camera apparatus for use with a plurality of composite film units carried by a magazine having means providing a discharge opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said magazine so that one of said sheets of the foremost film unit in said magazine is stationary, means for engaging and moving a portion of said foremost film unit so as to move the other sheet thereof out of superposition with said held sheet, means for exposing said photosensitive area when said sheets are out of superposition, means comprising a pair of pressure rolls mounted adjacent said holding means, said holding means being arranged to release said held sheet for sliding movement through said discharge opening, in superposition with the other sheet, between said pressure rolls, and means associated with said engaging and moving means for pushing said engaged sheet to cause a sliding of said film unit from its held position towards said rolls during at least a portion of said movement of said engaged sheet, said pressure rolls being adapted to compress said film unit during advancement of said unit between said pressure rolls, subjection of said composite unit to compression providing release of said processing liquid from said container and spreading of said liquid between facing surfaces of said exposed photosensitive sheet and said second sheet.

5. Camera apparatus for use with a plurality of composite film units carried by a magazine having means providing a discharge opening and an exposure opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said magazine so that a photosensitive sheet associated with the foremost film unit in said magazine is in exposure position in the camera, means for engaging and moving a portion of said film unit so as to move the other sheet out of superposition with said photosensitive sheet, means for exposing said photosensitive area when said sheets are out of superposition, means comprising a pair of pressure rolls mounted adjacent said holding means, said holding means being arranged to release said photosensitive sheet for sliding movement through said discharge opening, in superposition with the other sheet, between said pressure rolls, and means associated with said engaging and moving means for pushing said engaged sheet to cause a sliding of said film unit from its held position towards said rolls during at least a portion of said movement of said engaged sheet, said pressure rolls being adapted to compress said film unit during advancement of said unit between said pressure rolls, progressive subjection of said composite unit to compression providing release of said processing liquid from said container and spreading of said liquid between facing surfaces of said exposed photosensitive sheet and said second sheet.

6. Camera apparatus for use with a plurality of composite film units carried by a magazine having means providing a discharge opening and an exposure opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said magazine so that a photosensitive sheet associated with the foremost film unit in said magazine is in exposure position in the camera, means for engaging and moving a portion of said film unit so as to move the other sheet out of superposition with said photosensitive sheet, means for exposing said photosensitive area when said sheets are out of superposition, means comprising a pair of pressure members mounted adjacent said holding means, said holding means being arranged to release said photosensitive sheet for sliding movement through said discharge opening, in superposition with the other sheet, between said pressure members, means associated with said engaging and moving means for pushing said engaged sheet to cause a sliding of said film unit from its held position towards said members during at least a portion of said movement of said engaged sheet, and means for separating said pressure members during at least a portion of the sliding of said film unit towards said pressure members, said pressure members being adapted to compress said film unit during advancement of said unit between said pressure members, progressive subjection of said composite unit to compression providing release of said processing liquid from said container and spreading of said liquid between facing surfaces of said exposed photosensitive sheet and said second sheet.

7. Camera apparatus for use with a plurality of composite film units carried by a magazine having means providing a discharge opening and an exposure opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area and a metallic portion associated with said displaceable sheet which can be attracted by a magnet, said apparatus comprising, in combination, means for holding said magazine so that a photosensitive sheet associated with the foremost film unit in said magazine is in exposure position in the camera, means comprising a magnet for engaging and moving said metallic portion of said film unit so as to move the other sheet out of superposition with said photosensitive sheet, means for exposing said photosensitive area when said sheets are out of superposition, means comprising a pair of pressure rolls mounted adjacent said holding means, said holding means being arranged to release said photosensitive sheet for sliding movement through said discharge opening, in superposition with the other sheet, between said pressure rolls, and means associated with said engaging and moving means for pushing said engaged sheet to cause a sliding of said film unit from its held position towards said rolls during at least a portion of said movement of said engaged sheet, said pressure rolls being adapted to compress said film unit during advancement of said unit between said pressure rolls, progressive subjection of said composite unit to compression providing release of said processing liquid from said container and spreading of said liquid between facing surfaces of said exposed photosensitive sheet and said second sheet.

8. Camera apparatus for use with a plurality of composite film units carried by a magazine having means providing a discharge opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said magazine so that one of said sheets of the foremost film unit in said magazine is stationary, means for engaging and moving a portion of said foremost film unit so as to move the other sheet thereof out of superposition with said held sheet, means for exposing said photosensitive area when said sheets are out of superposition, and means comprising a pair of pressure rolls mounted adjacent said holding means, said holding means being arranged to release said held sheet for sliding movement through said discharge opening, in superposition with the other sheet, between said pressure rolls, a portion of said engaging means extending normal to the plane of said engaged sheet for exerting a pushing force longitudinally of said engaged sheet as it is swung around a pivot point to cause a sliding of said film unit from its held position towards said rolls during at least a portion of said movement of said engaged sheet, said pressure rolls being adapted to compress said film unit during advancement of said unit between said pressure rolls, subjection of said composite unit to compression providing release of said processing liquid from said container and spreading of said liquid between facing surfaces of said exposed photosensitive sheet and said second sheet.

9. Camera apparatus for use with a plurality of composite film units carried by a magazine having means providing a discharge opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said magazine so that one of said sheets of the foremost film unit in said magazine is stationary, means for engaging and moving a portion of said foremost film unit so as to move the other sheet thereof out of superposition with said held sheet, means for exposing said photosensitive area when said sheets are out of superposition, means comprising a pair of pressure members mounted adjacent said holding means, said holding means being arranged to release said held sheet for sliding movement through said discharge opening, in superposition with the other sheet, between said pressure members, said engaging and moving means swinging said engaged sheet around a pivot point, and other means for pushing said engaged sheet towards said pressure members, said pushing means swinging around a second pivot point spaced from said first pivot point to cause a sliding of said film unit from its held position towards said members during at least a portion of said movement of said engaged sheet, said pressure members being adapted to compress said film unit during advancement of said unit between said pressure members, subjection of said composite unit to compression providing release of said processing liquid from said container and spreading of said liquid between facing surfaces of said exposed photosensitive sheet and said second sheet.

10. Camera apparatus for use with a plurality of composite film units carried by a magazine having means providing a discharge opening and an exposure opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area and a metallic portion associated with said displaceable sheet which can be attracted by a magnet, said apparatus comprising, in combination, means for holding said magazine so that a photosensitive sheet associated with the foremost film unit in said magazine is in exposure position in the camera, means comprising a magnet for engaging and moving said metallic portion of said film unit so as to move the other sheet out of superposition with said photosensitive sheet, means for exposing said photosensitive area when said sheets are out of superposition, means comprising a pair of pressure rolls mounted adjacent said holding means, said holding means being arranged to release said photosensitive sheet for sliding movement through said discharge opening, in superposition with the other sheet, between said pressure rolls, and means associated with said engaging and moving means for pushing said engaged sheet to cause a sliding of said film unit from its held position towards said rolls during at least a portion of said movement of said engaged sheet, said pushing means comprising a hooklike member movable into the plane of said engaged sheet, said pressure rolls being adapted to compress said film unit during advancement of said unit between said pressure rolls, progressive subjection of said composite unit to compression providing release of said processing liquid from said container and spreading of said liquid between facing surfaces of said exposed photosensitive sheet and said second sheet.

11. Camera apparatus for use with a plurality of composite film units carried by a magazine having means providing a discharge opening and an exposure opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area and a metallic portion associated with said displaceable sheet which can be attracted by a magnet, said apparatus comprising, in combination, means for holding said magazine so that a photosensitive sheet associated with the foremost film unit in said magazine is in exposure position in the camera, means comprising a magnet for engaging and moving said metallic portion of said film unit so as to move the other sheet out of superposition with said photosensitive sheet, means for exposing said photosensitive area when said sheets are out of superposition, means comprising a pair of pressure rolls mounted adjacent said holding means, said holding means being arranged to release said photosensitive sheet for sliding movement through said discharge opening, in superposition with the other sheet, between said pressure rolls, and means associated with said engaging and moving means for pushing said engaged sheet to cause a sliding of said film unit from its held position towards said rolls during at least a portion of said movement of said engaged sheet, said pushing means comprising a hooklike member movable into the plane of said engaged sheet, an arm for carrying said magnet and said hooklike member, at least one of said elements being slidable with respect to said arm, and a cam for moving said slidable element towards the pivot point of said arm, said pressure rolls being adapted to compress said film unit during advancement of said unit therebetween, progressive subjection of said film unit to compression providing release of said processing liquid from said container and spreading of said liquid between facing surfaces of said exposed photosensitive sheet and said second sheet.

12. Camera apparatus for use with a plurality of composite film units carried by a magazine having means providing a discharge opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said magazine so that one of said sheets of the foremost film unit in said magazine is stationary, means for engaging and moving a portion of said foremost film unit so as to move the other sheet thereof out of superposition with said held sheet, means for exposing said photosensitive area when said sheets are out of superposition, means comprising a pair of pressure members mounted adjacent said holding means, said holding means being arranged to release said held sheet for sliding movement through said discharge opening, in superposition with the other sheet, between said pressure members, said engaging and moving means swinging said engaged sheet around a pivot point, other means for pushing said engaged sheet towards said pressure members, and means for causing said pushing means to travel along a curved path having portions which are closer to said pivot point than other portions thereof to cause a sliding of said film unit from its held position towards said members during at least a portion of said movement of said engaged sheet, said pressure members being adapted to compress said film unit during advancement of said unit between said pressure members, subjection of said composite unit to compression providing release of said processing liquid from said container and spreading of said liquid between facing surfaces of said exposed photosensitive sheet and said second sheet.

13. Camera apparatus for use with a plurality of composite film units carried by a magazine having means providing a discharge opening, each said unit comprising a photosensitive sheet including a photosensitive silver halide layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said apparatus comprising, in combination, means for holding said magazine so that one of said sheets of the foremost film unit in the magazine is stationary, means for engaging the other sheet of said foremost film unit and for swinging said engaged sheet so that a portion thereof follows a curved path so as to move said engaged sheet out of superposition with said held sheet, means for exposing said photosensitive area when said sheets are out of superposition, means comprising a pair of pressure members mounted adjacent said holding means, said holding means being arranged to release said held sheet for sliding movement through said discharge opening, in superposition with the other sheet, between said pressure members, means associated with said engaging and moving means for pushing said engaged sheet to cause a sliding of said film unit from its held position towards said members during at least a portion of said movement of said engaged sheet, and means for swinging said pushing means so that a portion of its path of movement is coincident with the first-named path and another portion of the path of said pushing means is between said first-named path and said pressure members, said pressure members being adapted to compress said film unit during advancement of said unit between said pressure members, progressive subjection of said composite unit to compression providing release of said processing liquid from said container and spreading of said liquid between facing surfaces of said exposed photosensitive sheet and said second sheet.

14. Camera apparatus for use with a plurality of composite film units carried by a magazine having means providing a discharge opening, each said unit comprising a photosensitive sheet including a photosensitive layer carried by a base, a second sheet superposed with an area of said photosensitive layer adapted to be exposed to light, a container carrying a processing liquid and positioned between said sheets adjacent an edge of said area, one of said sheets being displaceable from superposition with the other sheet to permit exposure of said photosensitive area, said magazine having means providing a second opening permitting movement of one of said sheets of a film unit out of superposition with the other of said sheets to permit exposure of said photosensitive area, said apparatus comprising, in combination, means for holding said magazine so that one of said sheets of the foremost film unit in said magazine is stationary, means for engaging and moving a portion of said foremost film unit so as to move the other sheet out of superposition with said held sheet, means for exposing said photosensitive area when said sheets are out of superposition, and means comprising a pair of pressure rolls mounted adjacent said holding means, said holding means being arranged to release said held sheet for sliding movement through said discharge opening, in superposition with the other sheet, between said pressure rolls, said moving means being arranged to return said sheet to its initial position and to slide both sheets of said film unit through said discharge opening and into the bite of said rolls by applying to said engaged sheet a force having a component parallel to said engaged sheet, said pressure rolls being adapted to compress said film unit during advancement of said unit between said pressure rolls, progressive subjection of said composite unit to compression providing release of said processing liquid from said container and spreading of said liquid between facing surfaces of said exposed photosensitive sheet and said second sheet.

15. Camera apparatus for use with a plurality of composite film units carried by a magazine having means providing a discharge opening, each said unit comprising a photosensitive sheet including a photosensitive layer carried by a base, a second sheet superposed with an area of said photosensitive layer adapted to be exposed to light, a container carrying a processing liquid and positioned between said sheets adjacent an edge of said area, said photosensitive sheet being displaceable from superposition with said second sheet to permit exposure of said photosensitive area, said magazine having means providing a second opening permitting movement of said photosensitive sheet of a film unit out of superposition with said second sheet to permit exposure of said photosensitive area, said apparatus comprising, in combination, means for holding said magazine so that said second sheet of the foremost film unit in said magazine is stationary, means for engaging and moving a portion of said foremost film unit so as to move said photosensitive sheet out of superposition with said held second sheet, means for exposing said photosensitive area when said sheets are out of superposition, and means comprising a pair of pressure rolls mounted adjacent said holding means, said holding means being arranged to release said held second sheet for sliding movement through said discharge opening, in superposition with the photosensitive sheet, between said pressure rolls, said moving means being arranged to return said sheet to its initial position and to slide both sheets of said film unit through said discharge opening and into the bite of said rolls by applying to said photosensitive sheet a force having a component parallel to said photosensitive sheet, said pressure rolls being adapted to compress said film unit during advancement of said unit between said pressure rolls, progressive subjection of said composite unit to compression providing release of said processing liquid from said container and spreading of said liquid between facing surfaces of said exposed photosensitive sheet and said second sheet.

OTTO E. WOLFF.

No references cited.